United States Patent
Blume et al.

(10) Patent No.: US 7,830,153 B2
(45) Date of Patent: Nov. 9, 2010

(54) PREVENTING AN OVERLOADING OF THE ELECTRONIC EVALUATION SYSTEM DUE TO VOLTAGE SPIKES IN MAGNETO-INDUCTIVE FLOWMETERS

(75) Inventors: Thomas Blume, Halle (DE); Dirk Steckel, Adelebsen (DE); Dieter Keese, Wahlsburg (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 12/143,536

(22) Filed: Jun. 20, 2008

(65) Prior Publication Data
US 2008/0307892 A1 Dec. 18, 2008

Related U.S. Application Data

(63) Continuation of application No. PCT/EP2006/011991, filed on Dec. 13, 2006.

(30) Foreign Application Priority Data

Dec. 23, 2005 (DE) .................. 10 2005 061 836
Feb. 17, 2006 (DE) .................. 10 2006 007 394

(51) Int. Cl.
*G01R 31/02* (2006.01)
(52) U.S. Cl. .................. 324/537; 324/600; 361/54
(58) Field of Classification Search .............. 324/620, 324/769, 537, 600; 361/54
See application file for complete search history.

(56) References Cited

U.S. PATENT DOCUMENTS

| 4,562,547 | A |  | 12/1985 | Shauger |
| 5,210,496 | A |  | 5/1993 | Hafner |
| 5,509,306 | A | * | 4/1996 | Yamamoto et al. ....... 73/204.15 |
| 5,525,924 | A | * | 6/1996 | Ueno et al. ................ 327/350 |
| 6,505,517 | B1 |  | 1/2003 | Eryurek et al. |
| 2002/0117009 | A1 |  | 8/2002 | Keech |
| 2004/0130326 | A1 |  | 7/2004 | Yamamoto |

FOREIGN PATENT DOCUMENTS

| DE | 29 41 383 A1 | 5/1981 |
| DE | 35 28 230 A1 | 2/1986 |
| DE | 43 39 771 A1 | 6/1995 |
| GB | 2 152 220 A | 7/1985 |
| JP | 6-111175 A | 4/1994 |

OTHER PUBLICATIONS

Form PCT/ISA/210 (International Search Report) dated Jul. 10, 2007.
Non-English version of German Office Action dated Nov. 17, 2006.

* cited by examiner

*Primary Examiner*—Vincent Q Nguyen
(74) *Attorney, Agent, or Firm*—Buchanan Ingersoll & Rooney PC

(57) ABSTRACT

The disclosure relates to a circuit arrangement for preventing overloading of magneto-inductive flowmeters. The disclosure can protect the amplifiers which are connected downstream thereof or the electronic evaluation system from overloading. To this end, the signal input circuit is provided with additional voltage-limiting diodes disposed downstream of the impedance converters so that eventual voltage tips are prevented during modulation in the downstream amplifiers of the evaluation electronics.

4 Claims, 1 Drawing Sheet

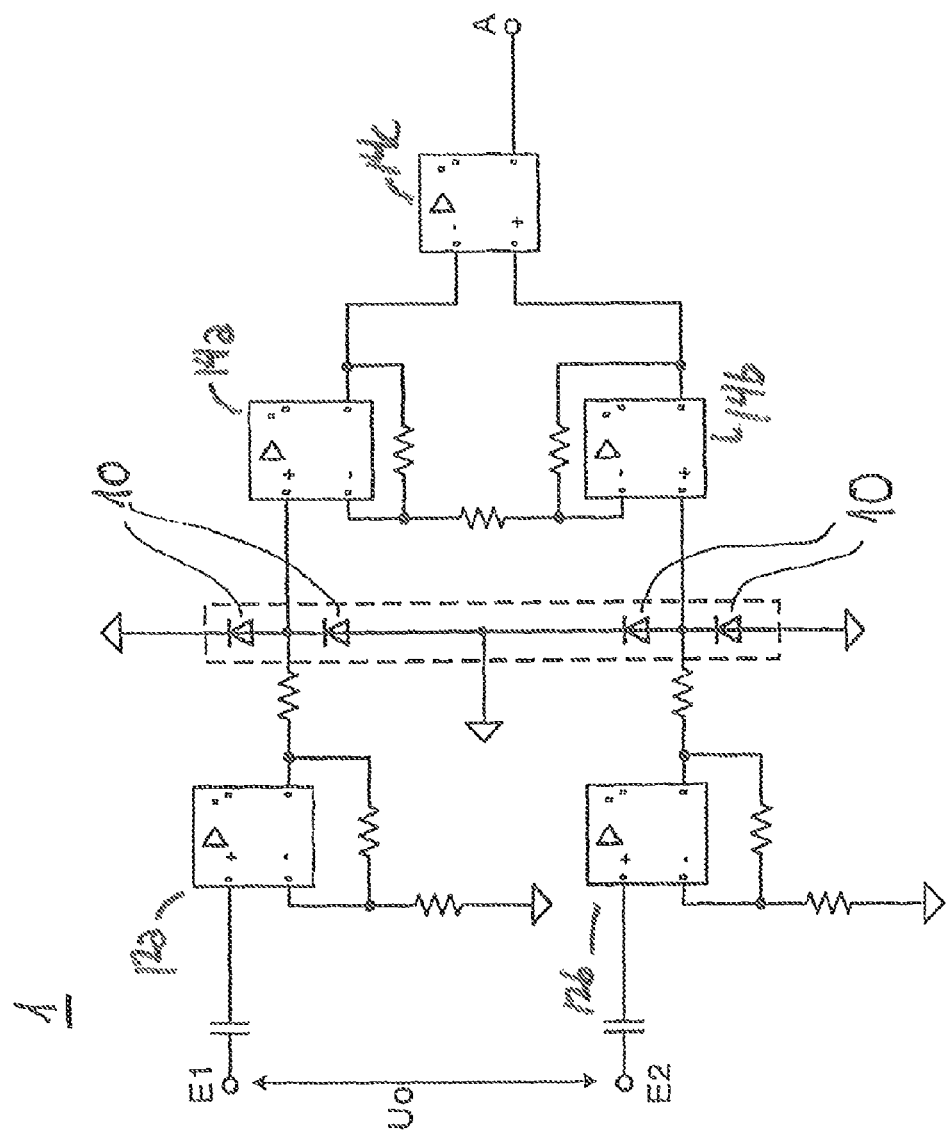
Figure

US 7,830,153 B2

PREVENTING AN OVERLOADING OF THE ELECTRONIC EVALUATION SYSTEM DUE TO VOLTAGE SPIKES IN MAGNETO-INDUCTIVE FLOWMETERS

RELATED APPLICATION

This application claims priority under 35 U.S.C. §119 to German Patent Application No. 10 2005 061 836.7 filed in Germany on Dec. 23, 2005 and German Patent Application No. 10 2006 007 394.0 filed in Germany on Feb. 17, 2006, and as a continuation application under 35 U.S.C. §120 to PCT/EP2006/011991 filed as an International Application on Dec. 13, 2006 designating the U.S., the entire contents of which are hereby incorporated by reference in their entireties.

TECHNICAL FIELD

The disclosure relates to the known measuring principle used in magneto-inductive flowmeters (MIF). For example, the disclosure relates to an electronic circuit which allows interference voltage spikes $U_{int}$, which can be additively superposed on the useful signals of the signal voltage $U_0$, and thus lead to an overloading of the electronic evaluation system, to be eliminated.

BACKGROUND INFORMATION

If an electronic evaluation system is overloaded, then the measured value cannot be determined during the overload. The current state of the art is to keep the measured value by means of downstream filter functions until interference-free signals are present once again. A disadvantage of the aforementioned method is the increased response time of the measuring system.

Signal voltage $U_0 = kvBD + U_{int}$

SUMMARY

Exemplary embodiments disclosed herein can damp the interference spikes occurring in the measurement procedure more strongly in order to protect the downstream amplifier.

A circuit arrangement for preventing an overloading of magneto-inductive flowmeters is disclosed, wherein the signal input circuit is provided with additional voltage-limiting diodes downstream of the impedance converters in such a way that possible interference spikes are prevented from passing through to the downstream amplifier of the electronic evaluation system.

A circuit arrangement for preventing an overloading of magneto-inductive flowmeters is disclosed, wherein the signal input circuit is provided with additional semiconductor components and/or an amplifier circuit with a low wattage downstream of the impedance converters so that possible interference spikes are prevented from passing through to the downstream amplifier of the electronic evaluation system.

In another aspect, a method is disclosed for preventing an overloading of magneto-inductive flowmeters based on a circuit arrangement. The method comprises providing a signal input circuit with voltage-limiting diodes downstream of an impedance converters to prevent possible interference spikes from passing through to a downstream amplifier.

BRIEF DESCRIPTION OF THE DRAWING

An exemplary embodiment to eliminate interference spikes superposed on the useful signal is illustrated. Specifically, a single FIGURE shows an exemplary electronic circuit diagram as described in the following text.

DETAILED DESCRIPTION

The disclosure relates to the known measuring principle used in magneto-inductive flowmeters (MIF). The physical effect used to measure the flow velocity is the law of induction. If an electrically conductive measuring material is lead through a magnetic field $\vec{B}$, an electric field $\vec{E}$ which is perpendicular to the flow direction $\vec{v}$ and the direction of the magnetic field is generated in the measuring material.

The disclosure relates to an exemplary electronic circuit embodiment which allows interference voltage spikes $U_{int}$, which can be additively superposed on the useful signals of the signal voltage $U_0$, and thus lead to an overloading of the electronic evaluation system, to be eliminated.

It is now the idea of the disclosure to connect additional voltage-limiting diodes 10 downstream of the impedance converters 12a, 12b in the signal input circuit 1 illustrated in the circuit diagram, in order to prevent passing possible interference spikes, and to protect the downstream amplifiers 14a, 14b, 14c of the electronic evaluation system from overloading.

It is known to operate impedance converters with an amplification of 1. The signal voltage needs to be amplified a number of times by the subsequent amplifier stages of the electronic evaluation system in order to evaluate the very small signal voltages. Interference spikes which occur are generally much greater than the signal voltage and can thus lead to an amplifier overload.

The illustrated exemplary circuit embodiment allows elimination of the interference spikes from the amplifier stages, so that overloading, and thus interference, of the measurement operation cannot occur.

In an alternative exemplary embodiment, the voltage-limiting diodes 10 are simply exchanged for corresponding semiconductor components and/or an amplifier circuit with a decreased wattage.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. An overload prevention circuit comprising:
a first and second input; a first impedance converter connected to receive an input signal from the first input and provide an output signal to amplifier;
a second impedance converter connected to receive an input signal from the second input and provide an output signal to the amplifier; and
plural pairs of voltage-limiting diodes connected in series between the first and second impedance converters and the amplifier, wherein the output of each impedance converter is connected between a respective one of the pairs of diodes to prevent the input of interference spikes to the amplifier.

2. The circuit arrangement of claim 1, wherein the amplifier is included in an electronic evaluation system.

3. An overload prevention circuit, comprising:
a first input and a second input;
a first impedance converter that receives a signal from the first input;

a second impedance converter that receives a signal from the second input;

an amplifier circuit connected to receive a first impedance converted signal from the first impedance converter and a second impedance converted signal from the second impedance converter;

plural voltage-limiting diodes connected in series between the first and second impedance converters and an input of the amplifier circuit, wherein the output of each impedance converter is connected to the diodes to limit interference spikes on an output of each of the first and second impedance converters.

4. The circuit arrangement of claim 3, wherein the amplifier circuit is included in an electronic evaluation system.

* * * * *